Patented Jan. 16, 1923.

1,442,413

UNITED STATES PATENT OFFICE.

ZACHARIAS OLSSON, OF NEW YORK, N. Y., ASSIGNOR OF SIX-TENTHS TO AUGUST RUST-OPPENHEIM, OF NEW YORK, N. Y.

REFRACTORY MATERIAL.

No Drawing.    Application filed September 15, 1920.   Serial No. 410,379.

*To all whom it may concern:*

Be it known that I, ZACHARIAS OLSSON, a subject of the King of Sweden, residing in the city, county, and State of New York, have invented a new Refractory Material, of which the following is a specification.

My invention relates to the manufacture of a refractory material suitable for crucibles, lining of furnaces and the like. Heretofore it has been the custom to utilize bauxite in the manufacture of refractory material. The great drawback has been that it required a large amount of clay (from 20 to 40 per cent) as a binder in order to make the bauxite plastic enough to be worked. I have found that by the use of a peculiar clay I am able to reduce the amount of binder used very materially.

I calcine bauxite, ground to 100 mesh, at a temperature of about 800° C. I take 95 parts of this calcined bauxite and 5 parts of bentonite and thoroughly mix the same. When it is desired to use this mixture, sufficient water is added to make it plastic. I have found that about 50% water by weight is satisfactory. By the use of bentonite as a binder I have been able to reduce the amount of binder used from 40% to 5%, the result being that there is a great deal less shrinkage and the crucible or the lining (when the refractory material is used for lining) gives much better results for the reason that there is more refractory material in the composition and less binder.

I claim:

A refractory material comprising not less than 95% of bauxite and not more than 5% of bentonite.

In testimony whereof I have affixed my signature to this specification.

ZACHARIAS OLSSON.